United States Patent Office 2,862,176
Patented Nov. 25, 1958

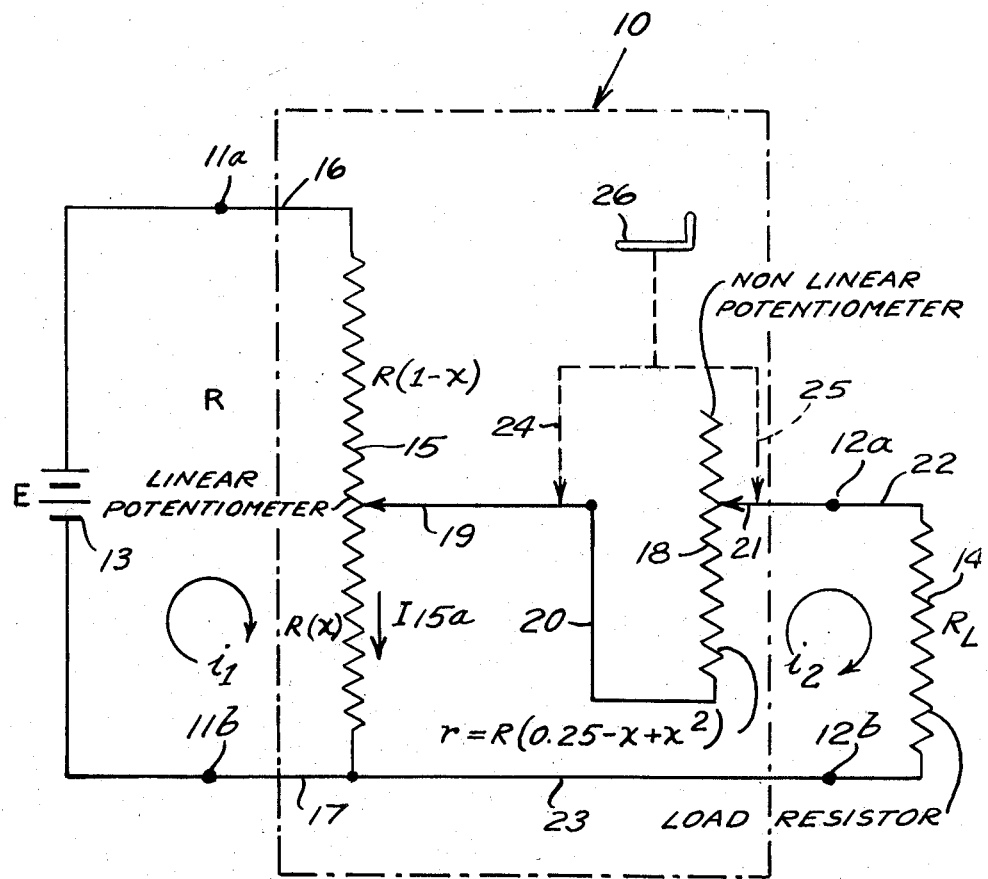

2,862,176
POTENTIOMETER LOADING COMPENSATOR

Howard E. Lustig, Flushing, N. Y., assignor to Sperry Rand Corporation, Ford Instrument Company Division, Long Island City, N. Y., a corporation of Delaware Application March 26, 1957, Serial No. 648,693

2 Claims. (Cl. 323—74)

This invention relates to variable voltage dividers and particularly to an improved circuit arrangement for providing linear voltage control.

Many variable linear voltage dividers are known and utilized in the present state of the electrical and electronic art for controlling the energization of resistive loads. Conventional potentiometer padding and non-linear potentiometer circuitry provide linear control but such designs have to be individually tailored for a specific load resistance or for a discrete ratio between the load resistance and the internal resistance of the voltage divider.

A principal object of this invention is to provide a new variable voltage dividing circuit for linear control of applied voltage to a constant load resistor.

As contemplated, a linear potentiometer and a non-linear potentiometer are connected in series between a voltage source and any load resistor having a constant resistance. Both potentiometers are ganged together and the non-linear potentiometer has a resistance distribution to add a corrective increment of resistance to the load resistor for maintaining linear voltage control over the entire range of the voltage divider. For the desired linear voltage control the resistance distribution $r$ of the non-linear potentiometer is fabricated to vary in accordance with the hereinafter derived formula:

$$r = R(0.25 - x + x^2)$$

wherein R is the maximum resistance of the linear potentiometer and $x$ is the fractional displacement of the ganged shafts, the maximum shaft displacement being 1.0. The output voltage $v$ of the new potentiometer combination is then:

$$v = (x)(E)\left[\frac{R_L}{0.25R + R_L}\right]$$

wherein E is the voltage of the source and $R_L$ is the load resistance. This equation is of the classic linear form $v = Kx$ for fixed values in input voltage E, resistance R and load resistance $R_L$.

The features of the invention will be understood more clearly from the following detailed description taken in conjunction with the accompanying drawing in which:

The schematic drawing represents a voltage divider for linear voltage control of applied voltage to a constant resistive load.

Referring to the schematic drawing, a linear variable voltage divider 10 has a pair of input terminals 11a and 11b and a pair of output terminals 12a and 12b. A voltage source 13 having a voltage of E is connected across the pair of input terminals, and a load resistor 14 having a resistance of $R_L$ ohms is connected across the output pair of terminals. The linear voltage divider 10 comprises a linear potentiometer 15 having a total stator resistance of R ohms connected across the input terminals 11a and 11b by conductors 16 and 17, respectively, and a non-linear potentiometer 18, the slider 19 of linear potentiometer 15 being connected to one stator terminal of non-linear potentiometer 18 by a conductor 20. The output terminal 12a is connected to the slider 21 of the non-linear potentiometer 18 by a conductor 22 and the output terminal 12b is connected to the input terminal 11b by a conductor 23. The frames of potentiometers 15 and 18 (not shown) are fixed relative to each other and their shafts 24 and 25, respectively, are mechanically coupled together whereby the same longitudinal movement along the resistance elements of the potentiometers 15 and 18 is always simultaneously imparted to the sliders 19 and 21 by a hand wheel 26 connected to drive these shafts.

The non-linear potentiometer 18 has a stator resistance distribution $r$ in accordance with the formula:

$$r = R(0.25 - x + x^2)$$

wherein R is the maximum resistance of potentiometer 15 and $x$ is the fractional displacement of slider 21 from the conductor 20, the fractional displacement being 1.0 when the slider 19 is in contact with the conductor 16. As a result of the fractional displacement $x$ of the shaft 24 of linear potentiometer 15 the slider 19 is positioned between two effective resistances of values $R(x)$ and $R(1-x)$, the former resistance value being adjacent to the conductor 17.

In the schematic diagram, $i_1$ is the clockwise current in the closed circuit of voltage source E, the conductor 16, the potentiometer 15 and the conductor 17 while $i_2$ is the clockwise current in the closed circuit of the conductor 20, the potentiometer 18, the load resistance $R_L$, the conductor 23 and the $R(x)$ resistance portion of the potentiometer 15. Hence, $E = i_1 R - i_2 R(x)$
$0 = i_1 R(x) + i_2 [R(x) + R(0.25 - x + x^2) + R_L]$
$v = i_2 R_L$, wherein $v$ is the voltage across load resistor 14

A solution of these equations yields:

$$v = (x)E\left[\frac{R_L}{0.25R + R_L}\right]$$

It will be noted that while the scale factor $$\left[\frac{R_L}{0.25R + R_L}\right]$$

changes with the load resistance $R_L$, the output voltage $v$ is linear with respect to the shaft displacement $x$ for any fixed load resistor.

It is to be understood that various modifications of the invention other than those described may be effected by persons skilled in the art without departing from the principle and scope of the invention as defined in the appended claims.

What is claimed is:

1. A loading compensator for a linear potentiometer by which the output voltage thereof will be maintained linear regardless of variations in the ratio between a load resistor and the resistance of the linear potentiometer, said loading compensator comprising a linear potentiometer having a resistance element and a slidable wiper output arm, a non-linear potentiometer having a resistance element and a slidable wiper output arm, means connecting said linear potentiometer to one terminal of a voltage source, means connecting said linear potentiometer output arm to one end of said non-linear potentiometer resistance element, a load, means connecting said load between said non-linear potentiometer output arm and the other terminal of said voltage source, and means by which the same longitudinal movement along the resistance elements of said linear potentiometer and said non-linear potentiometer is simultaneously imparted to both of said output arms.

2. A loading compensator as defined in claim 1 in which said non-linear potentiometer has a resistance distribution $r$ arranged in accordance with the formula $r=R(0.25-X+X^2)$, where R is the maximum resistance of said linear potentiometer and X is the fractional displacement of said output arms.

References Cited in the file of this patent

UNITED STATES PATENTS

| 1,195,660 | Dodge | Aug. 22, 1916 |
| 2,119,195 | Bagno | May 31, 1938 |
| 2,632,037 | Brancato et al. | Mar. 17, 1953 |

FOREIGN PATENTS

| 289,939 | Great Britain | May 2, 1928 |